(12) United States Patent
Kasasbeh et al.

(10) Patent No.: US 12,613,300 B2
(45) Date of Patent: Apr. 28, 2026

(54) DRONE AND CONTROLLER DETECTOR, DIRECTION FINDER, AND TRACKER

(71) Applicant: Drone Go Home, LLC, Oceanport, NJ (US)

(72) Inventors: Hadi Kasasbeh, Ocean, NJ (US); Ziang Gao, Morganville, NJ (US); Taylor Sinatra, Millstone Township, NJ (US); Linda Ziemba, Highlands, NJ (US)

(73) Assignee: Drone Go Home, LLC, Oceanport, NJ (US)

( * ) Notice: Subject to any disclaimer, the term of this patent is extended or adjusted under 35 U.S.C. 154(b) by 475 days.

(21) Appl. No.: 17/883,578

(22) Filed: Aug. 8, 2022

(65) Prior Publication Data

US 2023/0045154 A1     Feb. 9, 2023

Related U.S. Application Data

(60) Provisional application No. 63/230,141, filed on Aug. 6, 2021.

(51) Int. Cl.
| | |
|---|---|
| *G01S 3/04* | (2006.01) |
| *B64C 39/02* | (2023.01) |
| *G01S 3/16* | (2006.01) |
| *G01S 5/02* | (2010.01) |

(52) U.S. Cl.
CPC ............ *G01S 3/043* (2013.01); *B64C 39/024* (2013.01); *G01S 3/16* (2013.01); *G01S 5/0221* (2013.01)

(58) Field of Classification Search
CPC .......... G01S 3/043; G01S 3/16; G01S 5/0221; B64C 39/024
See application file for complete search history.

(56) References Cited

U.S. PATENT DOCUMENTS

| | | | | |
|---|---|---|---|---|
| 10,852,731 | B1 * | 12/2020 | Braley | ................ G07C 5/0808 |
| 2012/0313816 | A1 * | 12/2012 | Menegozzi | ............ G01S 11/04 |
| | | | | 342/451 |
| 2013/0027251 | A1 * | 1/2013 | Lu | ............................ G01S 3/34 |
| | | | | 342/451 |
| 2017/0088045 | A1 * | 3/2017 | Bezzina | ................ G01S 15/02 |
| 2017/0148467 | A1 * | 5/2017 | Franklin | ................ G10L 25/39 |

(Continued)

*Primary Examiner* — William Kelleher
*Assistant Examiner* — Hailey R Le
(74) *Attorney, Agent, or Firm* — Gearhart Law LLC

(57) ABSTRACT

Presented herein are embodiments of signal detection and location finding directed to a "Signature Detector and Direction Finder" (SDDF) add-on module. The SDDF is an add-on module to any Signal Detection System (SDS) that detects, locates, and/or tracks any type(s) of Radio Frequency (RF) signals. Even though the presented embodiments can be used with any RF signal type, the preferred targets are Uncrewed Aerial Vehicles (UAV) or drones, and their controllers. A goal of the SDDF add-on module is to recognize the reported signal of interest and identify its direction. The machine-learning feature enables the system (i.e. SDDF add-on module with SDS) to be deployable in various environments with flexibility in choosing the antenna type(s). The Signature Detector component of the SDDF add-on module uniquely filters drone/controller signals, hence, more accurate direction estimation of the detected signal by SDDF add-on module.

13 Claims, 13 Drawing Sheets

(56) References Cited

U.S. PATENT DOCUMENTS

| | | | |
|---|---|---|---|
| 2019/0064308 A1* | 2/2019 | Erad | G01S 3/043 |
| 2020/0264293 A1* | 8/2020 | Parker | G01S 7/414 |
| 2020/0355812 A1* | 11/2020 | Nguyen | G01S 5/02524 |
| 2021/0255356 A1* | 8/2021 | Vu | G01V 8/005 |
| 2021/0382161 A1* | 12/2021 | Steinmetz | G01S 13/867 |
| 2022/0069923 A1* | 3/2022 | Kasasbeh | H04W 52/225 |
| 2022/0308151 A1* | 9/2022 | Merk | G01S 3/48 |
| 2022/0390564 A1* | 12/2022 | Kasinec | G01S 7/4813 |
| 2022/0415191 A1* | 12/2022 | Mani | G08G 5/0013 |

* cited by examiner

DRONE AND CONTROLLER DETECTOR, DIRECTION FINDER, AND TRACKER

CLAIM OF PRIORITY

This application claims priority to U.S. Application Ser. No. 63/230,141 filed on Aug. 6, 2021, the contents of which are herein fully incorporated by reference in its entirety.

BRIEF DESCRIPTION OF THE DRAWINGS

For a more complete understanding of the invention, reference is made to the following description and accompanying drawings, in which.

SUMMARY OF THE EMBODIMENTS

Figure 1:
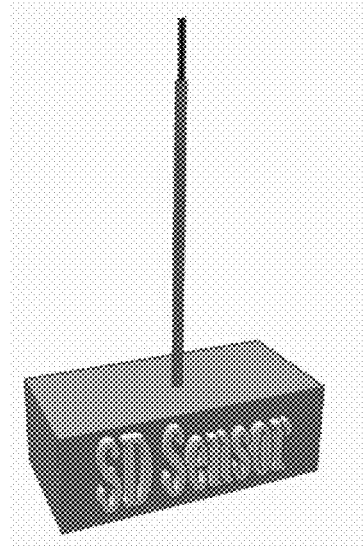
FIG. 1 The SD sensor general design.

The Drone Detection System (DDS) is one example on Signal Detection System (SDS). The DDS is system that can detect, track, and locate drone-like and controller-like signals. The main component of an existing DDS, named the SD sensor, is a Signature-Detector-based sensor with an omni-directional antenna. The primary role of an SD sensor is to detect UAV signals and measure their metrics, e.g.

Received Signal strength/power (RSS) for distance estimation. If the SDDF add-on module is coupled with the SD sensor, the SDDF sensor is formed. The SDDF sensor is a stand-alone sensor with the primary role of detecting and locating UAV signals and their controllers. The location estimation task is performed by combining the distance estimation with direction estimation. This patent focuses on the SDDF add-on module development by combining the RSS/power-based distance estimation from the SD sensor and direction estimation from the machine-learning-based direction finding algorithm. This patent also covers DDS development with better accuracy, higher efficiency, and improved flexibility and is related to US Application Publication 2022/0069923, the content of which are herein incorporated by reference.

The SDDF add-on module contains two submodules: the Signature Detector (SD) submodule and the Direction Finding (DF) submodule. The SD submodule is a correlation-based Radio Frequency (RF) detector unit that uses correlation and physical feature ex-traction to detect and recognize UAV-like and controller-like signals in the RF environment. The DF submodule is a machine-learning-based direction finding unit that is used to find the direction of the detected incoming signal. Note that the SDDF add-on module first receives the notification of an active UAV/controller signal detection from the attached DDS and/or the SD sensor. Then the SDDF add-on module uses its SD submodule to confirm the detection (recognize) of the reported UAV/controller signal, and further uses the DF submodule to find the direction of the reported UAV/controller signal. The direction is fed back to the DDS to enhance the DDS location prediction and improve the tracking accuracy of the detected UAV/controller signal.

When coupled together, the SDDF add-on module and the SD sensor form a stand-alone sensor named the SDDF sensor. The SDDF sensor works in two stages, Stage 1: use the SD sensor, scan the spectrum, detect drone/controller signals, then estimate the signal source distance from the SDDF sensor's omni-directional antenna.

Stage 2: use the SDDF add-on module, find the direction of the detected signal, then estimate its location using the intersection between the distance from Stage 1 and the direction from Stage 2.

Going through this patent, the reader may encounter the terms: SD submodule, SD sensor, DF submodule, SDDF add-on module, SDDF sensor, and stand-alone SDDF sensor. These terms must not be confused with one another as they refer to different parts of the DDS. This will become clear later on in the document. The following list provides short description of these terms:

SD submodule: is a correlation-based Radio Frequency (RF) detector unit that uses correlation and physical feature extraction to detect and recognize UAV-like and controller-like signals in the RF environment.

DF submodule: is a machine-learning-based direction finding unit that is used to find the direction of the detected incoming signal.

SDDF add-on module: a unit that is mainly constructed from an SD submodule and a DF submodule used to recognize the reported UAV/controller signal and identify its direction.

SD sensor: a unit that is mainly constructed from only an SD submodule. The SD sensor differs from the SD submodule in having networking features and the logic to run the SD submodule.

SDDF sensor: a unit that is mainly constructed from an SDDF add-on module and an SD sensor.

DDS: any drone detection system that can detect, recognize and locate a drone/controller-like signals.

Stand-alone SDDF sensor: is a DDS that consists of only one SDDF sensor.

One embodiment of DDS locating techniques is the trilateration method via a centralized Fusion Center (FC) and multiple SD sensors. Each SD sensor contains an RF detector module (i.e. the SD submodule) that detects UAV/controller signals through an omni-directional antenna (see FIG. 1), then the module measures the detected signal's power and reports this power value to the FC. The FC uses the reported power values from all SD sensors to locate the detected UAV and/or controller. In the described method, the FC translates the reported power value from each SD sensor into a distance between the detected UAV/controller and the corresponding reporting sensor. Each distance is then represented mathematically as a torus centered at its corresponding SD sensor. The intersections of these toruses are then processed to find the location of the detected UAV/controller signal.

The location estimation precision of a DDS can be improved using the SDDF add-on module. The detection is performed by the DDS, which uses a sensor network consists of SD sensors distributed in an area of interest. If the DDS detects a UAV/controller signal, the DDS network sends the detection information to the SDDF add-on module. The SDDF add-on module uses the received information from the DDS network to detect/recognize the reported signal using its SD submodule and then extracts the physical features of the reported signal locally. After the local extraction of the detected signal's physical features, the SDDF module uses its machine-learning-based DF submodule to find the direction from which the detected signal is emanating and then report the direction information back to the DDS. The DDS uses the received direction information in combination with the signal's physical features at the different SD sensor emplacements to locate the detected signal's origin using a combined direction finding and trilateration method. Note that the SDDF add-on module enhances the DDS locating and tracking accuracy of the detected UAV signal.

Figure 2:
FIG. 2 The SDDF add-on module general design.

As an add-on, the SDDF module may look similar to the example shown in FIG. 2. This SDDF add-on module (in FIG. 2) can work as an add-on module to the SD sensor (in FIG. 1) to construct a new fully operational DDS sensor (i.e. stand-alone SDDF sensor, see FIG. 3) that detects, tracks, locates, and finds the direction of UAV-like and/or controller-like signals. This means that a fully operational DDS can be constructed from one SDDF sensor, unlike the trilateration-based DDS that depends solely on SD sensors and requires at least three SD sensors to fully operate (i.e. can detect, track, and locate). Another form of the SDDF sensor (in FIG. 3) is depicted in FIG. 4. Even though the SDDF sensor (shown in FIG. 4) may have less common practical usage, it indicates that the two parts of the system (i.e. the SD sensor and the SDDF add-on module) do not need to be at the same location for the DDS to work.

In addition to increasing the location accuracy of a current DDS. The SDDF add-on module allows small facilities and vehicles to use a single sensor (i.e. the SDDF Sensor) as a full DDS to detect and locate the UAVs and their controllers in the surrounding areas.

DETAILED DESCRIPTION OF THE EMBODIMENTS

Sensor Hardware Design

Figure 5:
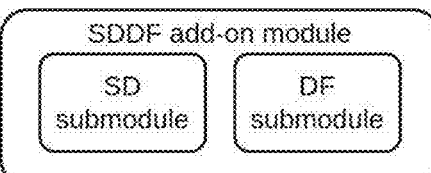
FIG. 5 SDDF add-on module internal submodules.

As depicted in FIG. 5, the SDDF add-on module in FIG. 2 consists of two submodules: the SD submodule and the DF submodule. The SD submodule confirms the reception of the reported signal by the DDS at each directional antenna and finds the signal's power, while DF submodule finds the direction from which the detected signal originates.

Figure 3:
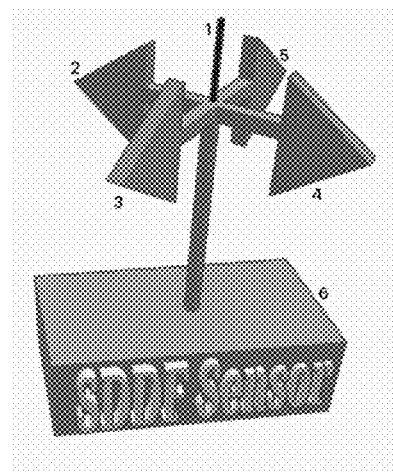
FIG. 3 The stand alone SDDF Sensor general design.
Figure 4:
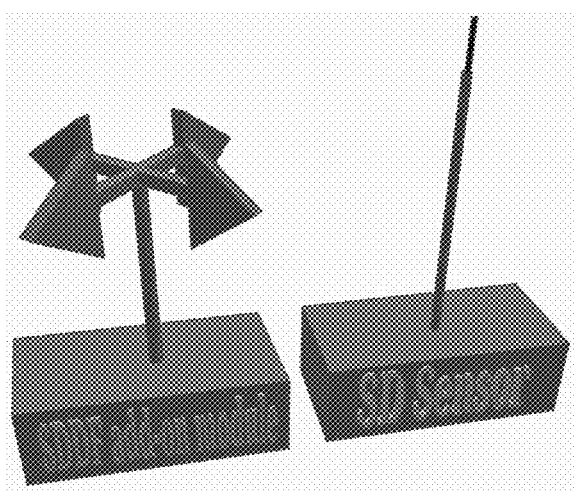
FIG. 4 The detached version of the stand alone SDDF Sensor general design.

As seen from FIG. 3 and FIG. 4, the SDDF sensor is constructed out of one SD sensor and one SDDF add-on module. Note that the SDDF add-on module consists of two submodules: DF submodule and SD submodule. FIG. 3 shows one omni-directional antenna (Element 1 in FIG. 3) and four directional antennas (Elements 2 to 5 in FIG. 3). The omni-directional antenna is used by the SD sensor to scan the frequency spectrum and detect UAV/controller-like signals.

Figure 6:
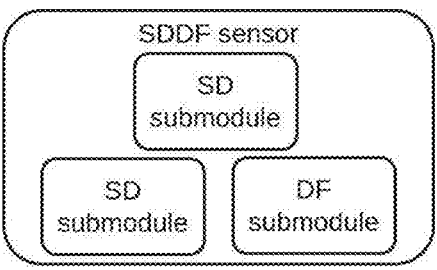
FIG. 6 SDDF Sensor internal submodules.

In the case of the stand-alone SDDF sensor, the SDDF sensor FIG. 6 consists of three submodules: Two RF detection submodules (i.e. SD submodules) and a DF submodule. The first SD submodule scans the frequency spectrum and detects a drone/controller existence using the omnidirectional antenna, then translates the detected signal power value into a distance (which is represented mathematically as a torus around the omni-directional antenna). The second SD submodule works with the third submodule (i.e. DF submodule) to confirm the reception of the detected signal at each directional antenna and finds the direction from which the detected signal originates using the DF submodule. The intersection between the torus and the direction provides an estimated location of the detected drone/controller. Because the DF submodule's direction estimation may contain a margin for error, the estimated direction is represented mathematically as a cone with the tip at the SDDF sensor side. The intersection between the torus and the cone provides a 3-Dimensional space of points that drone/controller signal emanates from, the average of these points represents the expected location of the drone/controller. In the 2-Dimensional space, the predicted direction can be represented as a triangle, while the predicted distance is represented by a ring. The intersection between the triangle and the ring is a 2-Dimensional area that represents all the possible points of the detected drone/controller signal's location. The average of these points represents the expected location of the detected signal.

The list below provides four general SD sensor and SDDF sensor hardware designs, including the main DDS hardware building blocks needed to detect, locate, and track UAVs and their controllers.

Figure 7:
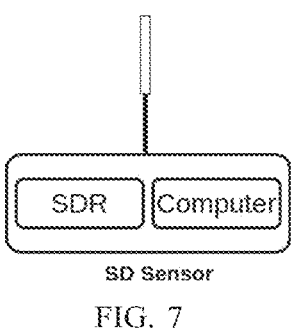
FIG. 7 Main internal hardware component of an SD Sensor.

Design 1 in FIG. 7: Software-Defined Radio (SDR), computer, and omni-directional antenna. This design shows the main hardware components of the SD sensor.

Figure 8:
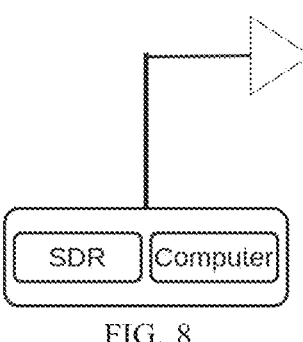
FIG. 8 General hardware components that can be used to construct the SD sub-module and the DF submodule.

Design 2 in FIG. 8: SDR, computer, and one directional antenna. This design can be used by both the SD submodule and the DF submodule to form the SD sensor or the SDDF sensor.

Figure 9:
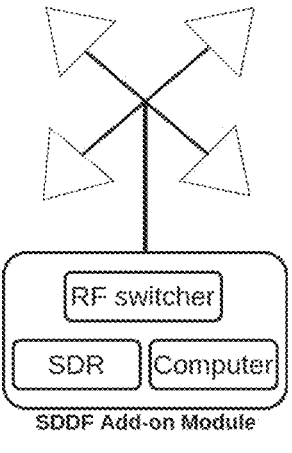
FIG. 9 SDDF add-on module main hardware components.

Design 3 in FIG. 9: SDR, computer, RF switcher, and multiple directional antennas. This design shows the main hardware components needed to construct SDDF add-on module.

Figure 10:
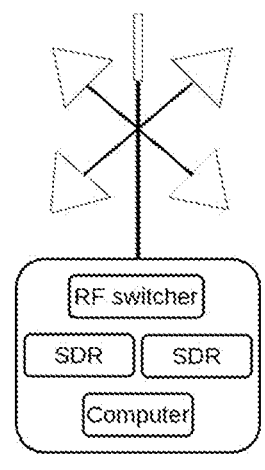
FIG. 10 SDDF Sensor main hardware components.

Design 4 in FIG. 10: two SDRs, computer, RF switcher, and multiple directional antennas. This design shows the main hardware components needed to construct SDDF Sensor.

Note that in Design 4, the SDDF sensor has two SD submodules, one used by the SDDF add-on module and the other used by the SD sensor. The SD sensor and the SDDF add-on module do not share the SDDF sensor SD submodule, this is important from a performance perspective for two reasons:

For continuous RF environment monitoring, it is important for the sensor's SD sub-module not to be used by the SDDF add-on module.

Having two SD submodules allows for faster operation in detection and location.

Notice the modular feature in constructing the DDS system design, this feature provides an effective way to improve and develop each module as well as the DDS system as a whole. For example, the SD submodule role is to detect and report the existence of a drone/controller signal, while the SDDF submodule role is to use the information reported by SD submodule to find the direction from which the signal originates and simultaneously ignore any other signal that is not reported by the SD submodule.

In the listed hardware designs, it is possible to have multiple SDR cards, computers, directional antennas, and omni-directional antennas. The hardware design depends on the intended purpose and required performance level. For example, the SD and DF submodules can share the same SDR card, computer, and directional antennas, but if this affects the performance, each module may have its own computer(s), SDR card(s), omni-directional antenna(s), and directional antenna(s).

Figure 11:
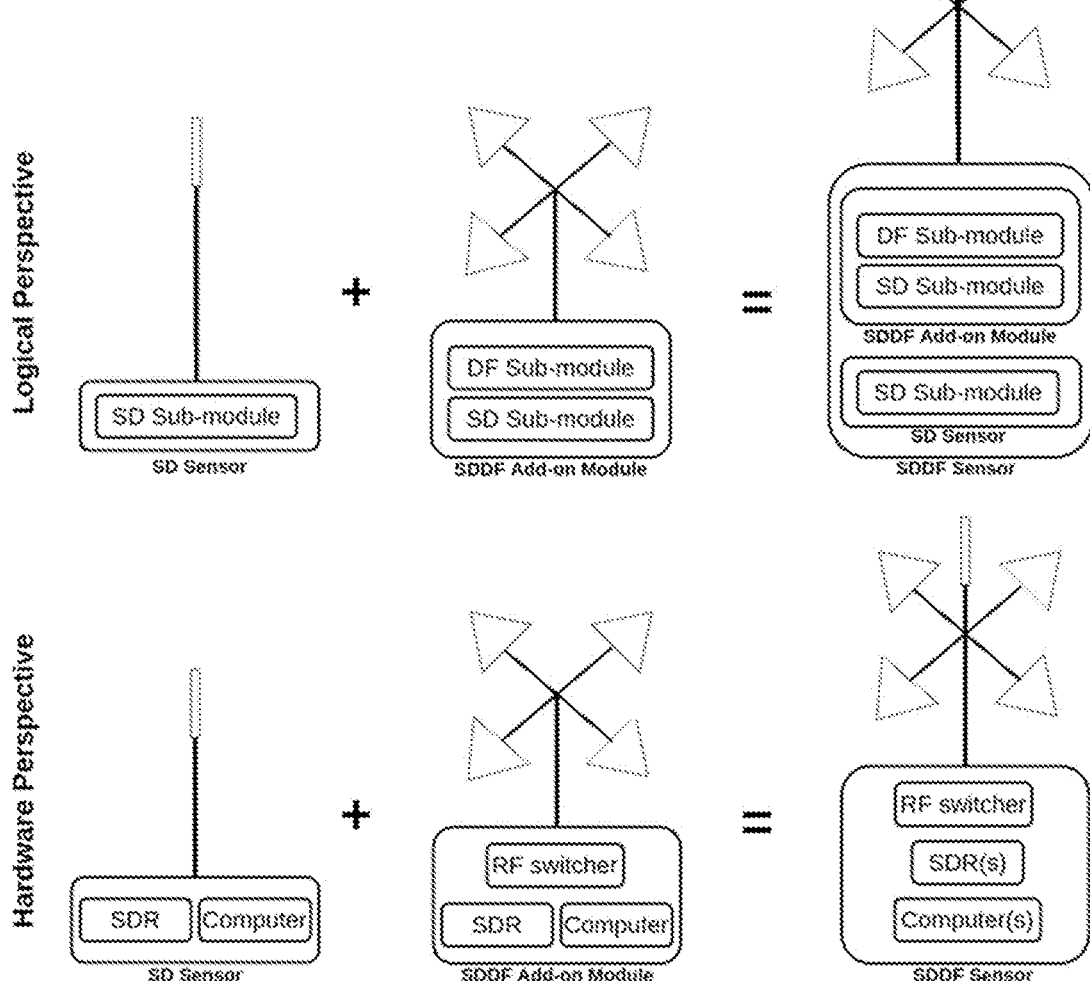
FIG. 11A summary of the SDDF sensor design and its internal components form a logical and hardware perspectives.

From a logical and hardware perspective, FIG. 11 shows a summary diagram of the internal components of the SD sensor, the SDDF add-on module, and the SDDF sensor. As seen in FIG. 11, the SD sensor only contains one SD submodule, while the SDDF add-on module contains one SD submodule and one DF submodule. The SD sensor and the SDDF add-on module can form together the SDDF sensor.

SDDF Sensor Proposed Algorithm

Figure 12:
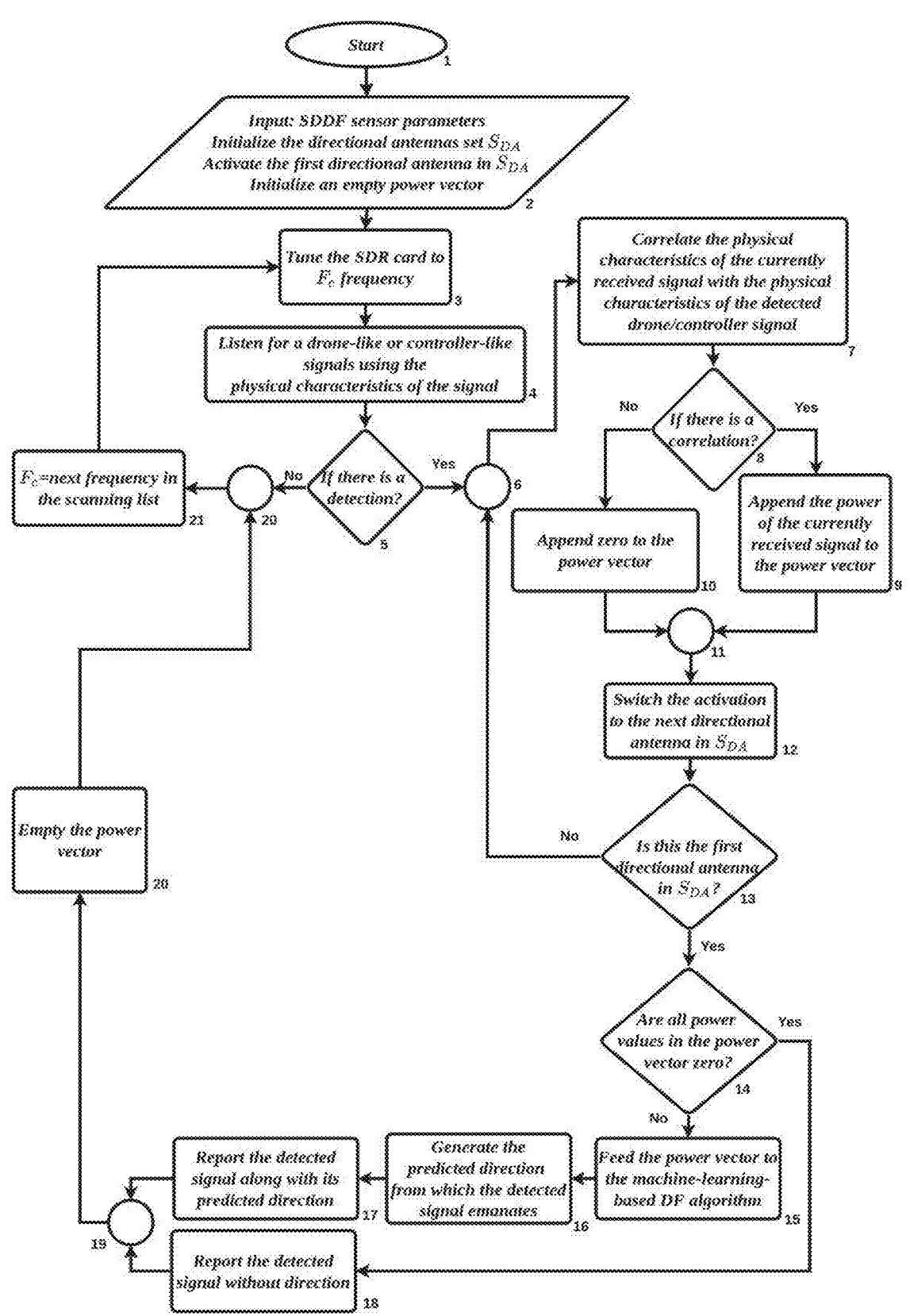
FIG. 12 Proposed SDDF sensor algorithm using one SDR card.
Figure 13:
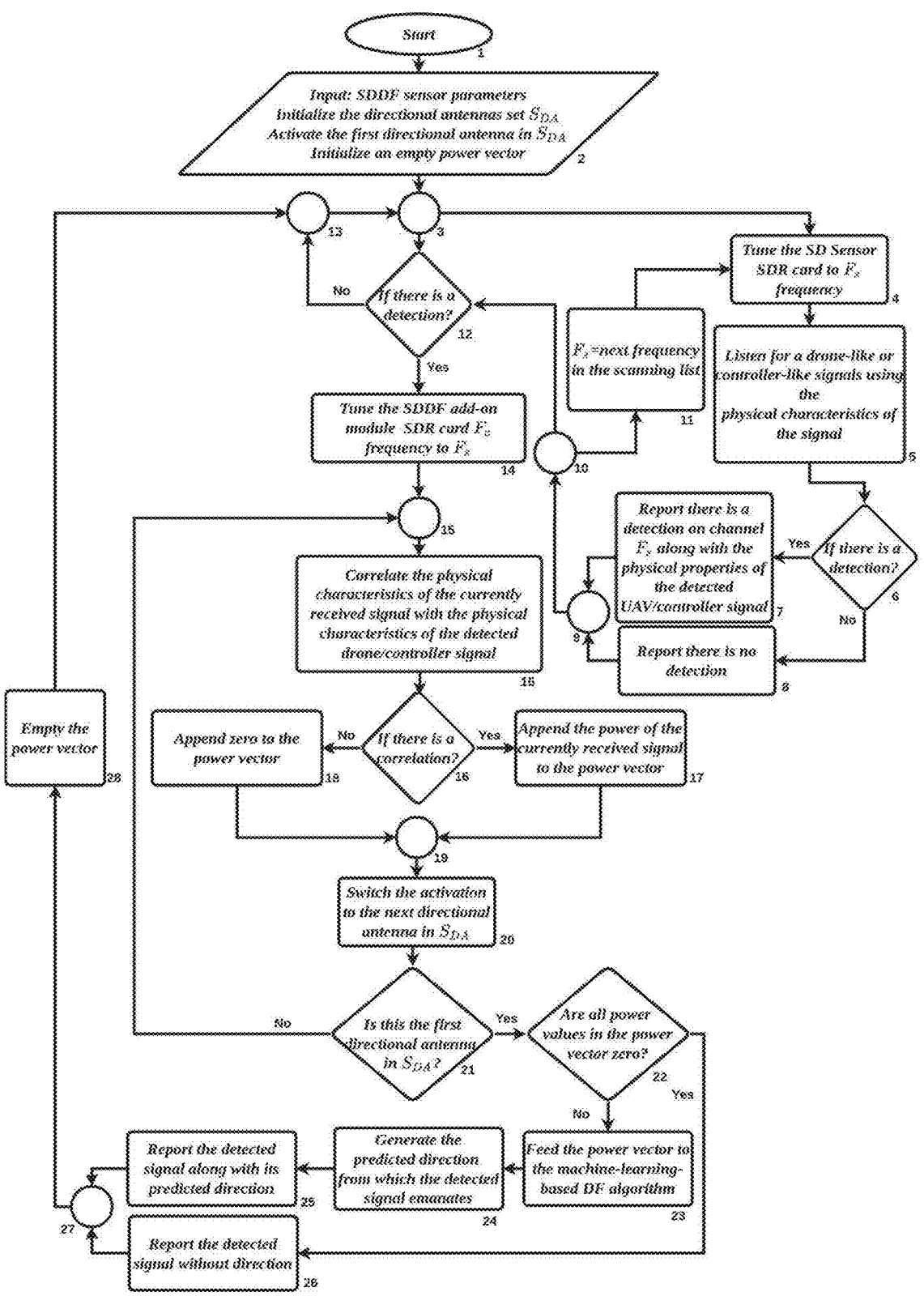
FIG. 13 Proposed SDDF sensor algorithm using two SDR cards.

FIG. 12 and FIG. 13 show the flow charts representing the general logic behind the proposed Machine-Learning-based and Correlation-based Direction Finding (MLCDF) algorithm. FIG. 12 shows the flow chart in the case of using one SDR card by the SDDF sensor to be used by the SD sensor component and SDDF add-on module component. FIG. 13 shows the flow chart in the case of using two SDR cards by the SDDF sensor, the first to be used by the SD sensor component, while the other to be used by the SDDF add-on module component. Note that even though the use of one SDR card requires less hardware and the MLCDF algorithm is simpler, this design may not provide better performance than the use of two SDR cards.

The advantage of the correlation-based DF algorithm is that it filters out all the unwanted signals and focuses the DF process on the reported signal by the DDS or the SD sensor and ultimately a more precise DF output. The correlation step also prevents the SDDF add-on module from recording the signal power of the noises and interference when the signal is absent from the tuned frequency channel.

The advantage of the machine-learning-based DF algorithm is a less complex antenna design and allows for asynchronous measurements from directional antennas.

The machine-learning part of the MLCDF algorithm is built prior to operating the algorithm by collecting two sets of data:

Training data
Testing data

In the training data set, power vectors and their corresponding true signal directions are collected. Each power vector has a number of elements equal to the number of directional antennas. The $n^{th}$ element of any of the collected power vectors comes from the $n^{th}$ directional antenna. Each of the power values is a measurement of an existing drone/controller's signal on a pre-defined channel by the operator. After collecting the training data, the machine-learning technique is used to adjust the parameters of a neural network to minimize the total error between the predicted direction and the actual true directions collected previously in the training data set. After designing the neural network (i.e. direction finding prediction model), the testing data (which has the same structure as the training data set but typically with a smaller set size) is used to measure the accuracy of the designed di-rection finding prediction model. If the accuracy does not satisfy the system requirements, more training data is needed and the design process needs to be conducted again. In some cases, the design of the neural network (number of layers and nodes, and connections) needs to be modified as well. Once the prediction model is finalized, it can be added to MLCDF algorithm (i.e. blocks FIG. 12.15 and FIG. 13.23). The training and modeling stage can be automatically or periodically conducted to keep the prediction model up-to-date with the environmental and wireless channel changes.

As mentioned previously, the power collection in the training set, the testing set, and the MLCDF algorithm are based on correlation values before the collection. If the physical signal characteristics seen on the $n^{th}$ directional antenna are similar (i.e. above a certain threshold) to the physical signal characteristics reported by the SD submodule, then the power value is recorded, otherwise, a value of zero is recorded. This is important for filtering other signals in the channel so the DF submodule does not report them which results in a highly accurate direction prediction.

To operate, the SDDF add-on module uses MLCDF algorithm. Once a signal is detected by the DDS, or the attached SD sensor, the SDDF add-on module tunes the operating frequency of its SD submodule SDR on the frequency channel of the detected UAV/controller's signal. Then, the SDDF add-on module uses its DF submodule to activate each of the directional antennas in sequential order. Once a directional antenna is activated, the DF submodule measures the power of the detected signal as seen by the activated directional antenna. If the detected signal is not seen by the activated directional antenna, the DF submodule records a zero power value for the detected signal corresponding to the activated directional antenna. Note that there might be other types of signals occupying the frequency channel of the detected signal, hence, to make sure that the power values recorded by the DF submodule are coming from the signal that was detected by the DDS or the SD sensor, the DF submodule feeds the received signal by the activated directional antenna to the SD submodule and extracts its physical features. If the extracted physical features of the detected UAV/controller signal match those detected by the SD sensor, the DF submodule records the signal power corresponding to the active directional antenna, else the DF submodule records a power of zero corresponding to the activated directional antenna.

At the end of each directional antennas activation cycle, the DF submodule collects all the recorded power values of the detected signal from the directional antennas in a power vector and feeds the vector into a previously trained machine-learning system to predict the direction from which
the UAV/controller signal is coming from, relative to the
antenna array, based on the values of in the power vector.
Note that the predicted direction by the DF submodule is not
the direction of the receiving directional antenna, because
multiple directional antennas may be receiving the detected
signal simultaneously. The predicted direction is a result of
DF process resulting from taking the power values at from
all directional antennas as input. The predicted direction of
the detected drone/controller signal can be the combination
of any angle value from 0 to 180 in elevation and any angle
value from 0 to 360 in azimuth. Note that the directional
antennas need to point in different directions to achieve the
needed diversity in the readings, which is important in
training the machine-learning algorithm, and for it to predict
the direction of the detected signal.

The DF process in the SDDF add-on module can be
divided into three steps:

Step 1: Correlate (i.e. measure the similarity between) the
physical characteristics of the received signal on each
directional antenna with the physical characteristics of
the detected signal from a DDS or SD sensor.

Step 2: If the physical characteristics of the received
signal correlate (i.e. the similarity value is above a
certain threshold) with the physical characteristics of
the detected signal (from the DDS or SD sensor), then
the SDDF add-on module assumes the received signal
from the directional antenna is the detected signal from
DDS or SD sensor. When the correlation happens, the
SDDF add-on module records the power level of the
signal received by the active directional antenna, then
the SDDF add-on module deactivates the current
antenna and activates (switches to) the next antenna.
This process is repeated for some or all of the antennas
in the antenna array. If no correlation occurs, the SDDF
add-on module records a power of zero for the cur-
rently active directional antenna.

Step 3: After collecting power readings from some or all
directional antennas, the SDDF add-on module feeds
the readings to its trained machine-learning system
which outputs an angle value that points to the direction
from which the signal is coming. In the case that all
power readings are zero, no direction is given by the
SDDF add-on module.

It is important to correlate the received signal's physical
characteristics at each directional antenna with the DDS/SD
sensor detected and reported signal's physical characteris-
tics by the SDDF add-on module. The correlation step helps
filter other sources that occupy the channel and prevent the
DDS or the SD sensor from false detection/reporting. The
correlation process increases the direction prediction accu-
racy since it reduces any interference effects on the power
readings before it predicts the direction. For example, this
correlation step can be very helpful in bands where multiple
signal sources operate without coordination such as the
Industrial, Scientific, and Medical (ISM) bands, the ability
to filter out all the signals occupying one frequency and
recognize the detected drone/controller-like signal is impor-
tant in measuring the accurate signal power, hence, more
precise direction finding process. Note that the SD submod-
ule does not just provide detection of UAV-like and con-
troller-like signals but also can provide the physical char-
acteristics of any detected signal. The SDDF sensor can use
the detected signal's physical characteristics for the corre-
lation process and update its local library which contains
previously detected UAV-like and controller-like signals and
their physical characteristics. The SD submodule can provide the physical characteristics and the type of the detected
signal to the SDDF sensor for correlation. Note that the
SDDF sensor stores a local library which contains drone and
controller signal types and their corresponding physical
characteristics. This local library is updated continuously.

Based on the previous general explanation of the MLCDF
algorithm, in the following, the flowcharts of the two types
of the MLCDF are explained in more details.

Single-SDR MLCDF Algorithm

The single-SDR version of the MLCDF algorithm is
presented in FIG. 12. The algorithm starts at FIG. 12.1, then
at the input stage FIG. 12.2, the MLCDF algorithm initial-
izes the needed parameters (e.g. signal to interference and
noise ratio detection threshold, the set $S_{DA}$ of the directional
antennas to be used, local library, the set of frequency
channels to be scanned, correlation threshold), the first
directional antenna from the set $S_{DA}$ is activated, and an
empty power vector is initialized. Next, the MLCDF tunes
the SDR card to the first channel in the frequency channel set
and starts analyzing (listening to) the received RF signals at
the omni-directional antenna of the SDDF sensor FIG. 12.4.
During the analyzation process FIG. 12.4, the SD sensor part
of the SDDF sensor extracts the physical characteristics of
the received signal and correlate it with the local library of
drone/controller signals, then checks the matching levels
FIG. 12.5. If there is no match/detection (i.e. the correlation
value is lower than the correlation threshold), then the SDDF
tunes the SDR card operating frequency to the next fre-
quency in the scanning list (FIG. 12.21 and FIG. 12.3), and
then starts the analyzing process again at FIG. 12.4. If there
is a match (i.e. the correlation value is larger than or equal
to the correlation threshold), then there is a detection of a
drone/controller-like signal. Hence, the SD sensor part of the
SDDF sensor measures the received power value of the
detected signal and estimates how far is its source from the
omni-directional antenna. Then, the MLCDF algorithm
logic flows to block FIG. 12.7 where the SDDF add-on
module starts its operation.

At block FIG. 12.7, the SDDF add-on module uses its SD
submodule to analyze the currently received RF signal at the
currently activated directional antenna. During the analysis,
the SDDF add-on module extracts the physical characteris-
tics of the currently received signal and test its physical
characteristics correlation with the physical characteristics
of the detected signal. If there is no match (i.e. the correla-
tion value is lower than the correlation threshold), then the
SDDF add-on module (at block FIG. 12.10) records a power
of zero (in the power vector) corresponding to the currently
activated direction antenna. If there is a match (i.e. the
correlation value is larger than or equal than the correlation
threshold), then the SDDF add-on module (at block FIG.
12.9) records in the power vector the power of the received
signal (at the currently activated directional antenna).

After the power recording in block FIG. 12.9 or FIG.
12.10, the MLCDF switches the activation to the next
directional antenna from the set $S_DA$ at the block FIG. 12.12.
The MLCDF then checks if the recently activated directional
antenna is the first directional antenna in the set $S_DA$ at block
FIG. 12.13. If "No", then the power collection process from
all the directional antennas in $S_DA$ has not finished yet,
hence, the MLCDF starts the power collection process at the
currently activated directional antenna starting from block
FIG. 12.7. If "Yes", then the power collection process from
all the directional antennas in $S_DA$ has finished, hence, the
MLCDF checks the individual power values in the collected
power vector at block FIG. 12.14. If all power values are
zero, then a direction can not be estimated, and hence, the

9

MLCDF reports (at block FIG. 12.18) the type of the detected drone/controller-like signal and how far it is but without a direction estimation. If at least one power value is non-zero, then a direction can be estimated, and hence, the MLCDF inputs the collected power vector to the previously trained machine-learning/neural-network system of the DF submodule (at block FIG. 12.15). Then, the detected signal's direction gets estimated at block FIG. 12.16.

After the direction estimation, the MLCDF logic flows to block FIG. 12.17 where the type of the detected drone/controller-like signal, how far it is, its estimated direction, and its estimated location are reported. After reporting the detected signal at block FIG. 12.17 or FIG. 12.18, the MLCDF empty the power vector at block FIG. 12.20, tune the SDR frequency to the next frequency channel in the scanning list (at blocks FIG. 12.21 and FIG. 12.3), and starts the whole process again with the signal detection and analysis using the SD sensor part of the SDDF sensor at block FIG. 12.4.

Double-SDR MLCDF Algorithm

The double-SDR version of the MLCDF algorithm is presented in FIG. 13. The algorithm starts at FIG. 13.1, then at the input stage FIG. 13.2, the MLCDF algorithm initializes the needed parameters (e.g. signal to interference and noise ratio detection threshold, the set $S_{DA}$ of the directional antennas to be used, local library, the set of frequency channels to be scanned, correlation threshold), the first directional antenna from the set $S_{DA}$ is activated, and an empty power vector is initialized. Next, at FIG. 13.3, the MLCDF logic flows into two directions: the first direction operates the SD sensor part of the SDDF sensor and starts at block FIG. 13.4, while the second direction operates the SDDF add-on module part of the SDDF sensor and starts at block FIG. 13.12.

In the first flow direction at FIG. 13.4, the MLCDF tunes the first SDR card (i.e. the SD sensor's SDR card) to the frequency $F_s$ which has the value of the first frequency in frequency scanning list and starts analyzing (listening to) the received RF signals at the omni-directional antenna of the SDDF sensor FIG. 13.5. During the analyzation process FIG. 13.5, the SD sensor part of the SDDF sensor extracts physical characteristics of the received signal and correlate it with the local library of drone/controller signals, then checks the matching level FIG. 13.6. If there is no match (i.e. the correlation value is lower than the correlation threshold), then the SD sensor reports to the SDDF add-on module that there is no detection and the MLCDF logic flows to block FIG. 13.12 where a check on the detection report takes place, and to block FIG. 13.11 where the MLCDF tunes the SD sensor's SDR card operating frequency ($F_s$) to the next frequency in the scanning list and then starts the analyzing process again at FIG. 13.5.

If there is a match (i.e. the correlation value is larger than or equal to the correlation threshold), then there is a detection of a drone/controller-like signal. Then, the SD sensor part of the SDDF sensor measures the received power value of the detected signal and estimates how far is its source from the omni-directional antenna. Then the SD sensor reports (at block FIG. 13.7) to the SDDF add-on module that there is a detection. In this report, the signal type, the detected signal's frequency channel $F_s$, the signal's power, and the signal's estimated distance are included.

After the reporting, the MLCDF logic flows to block FIG. 13.12 where a check on the detection report takes place, and to block FIG. 13.11 where the MLCDF tunes the SD sensor's SDR card operating frequency ($F_s$) to the next frequency in the scanning list and then starts the analyzing process again at FIG.

At block FIG. 13.12 (which marks the start of the SDDF add-on module operation), the MLCDF continuously checks for reports from the SD sensor coming from block FIG. 13.7 or FIG. 13.8. If there is no detection, the checking process at FIG. 13.12 continues until there is a detection.

When there is a signal detection, a report from block FIG. 13.7 arrives at FIG. 13.12, hence, the MLCDF logic flows to block FIG. 13.14.

At block FIG. 13.14, the MLCDF tunes the SDDF add-on module's SDR card (i.e. the second SDR card of the SDDF sensor) to the frequency of the detected signal (i.e. $F_s$). Then, the MLCDF algorithm goes into the process of estimating the direction of the detected signal from block FIG. 13.16 to block FIG. 13.28 (in a similar way to the single-SDR MLCDF flowchart from block FIG. 12.7 to block FIG. 12.20).

Directional Antenna Design

Figure 14:
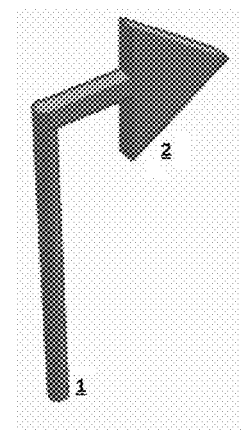
FIG. 14 Multi-element directional antenna.
Figure 15:
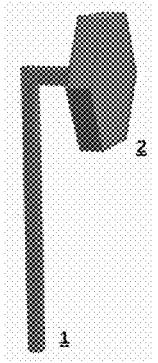
FIG. 15 Patch directional antenna.

Directional antennas and directional antenna arrays come in many designs, shapes, and forms. FIG. 14 and FIG. 15 are some examples of directional antennas that may be used in the SDDF add-on module design. The machine-learning feature of the MLCDF provides the flexibility to use multiple types of directional antennas in the SDDF add-on module without the need for precise tuning. Because the machine-learning feature compensates to a certain degree for design or hardware inefficiencies, non-identical directional antennas can be used.

Each of the antennas in FIG. 14 and FIG. 15 can be used independently to detect and locate in a certain direction, or used as a subarray within a larger antenna array.

Directional antennas come in different designs to achieve different purposes. For example, the directional antenna in FIG. 14 is a multi-element directional antenna mounted on a pole. FIG. 14's configuration can provide high gain and directionality properties, but is expensive and bulky compared to other types of directional antennas such as FIG. 15. The directional antenna in FIG. 15 is a patch antenna and is known to be small and cheap with low gain and directionality properties.

Figure 16:
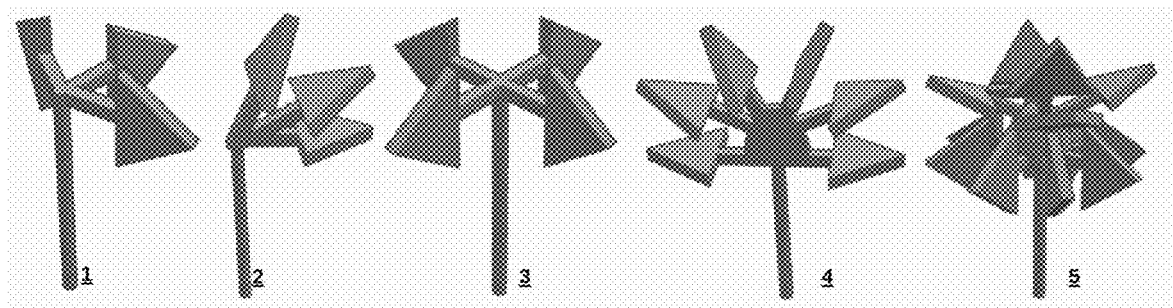
FIG. 16 Directional antenna array examples.

FIG. 16 shows directional antenna array examples that can be constructed for various purposes, such as detecting and direction finding in a certain horizontal direction FIG. 16.1, certain vertical direction FIG. 16.2, certain horizontal plane FIG. 16.3, certain vertical plane FIG. 16.4, and in all directions and planes FIG. 16.5. These designs are examples of countless possibilities that may be used by the SDDF sensor.

Figure 17:
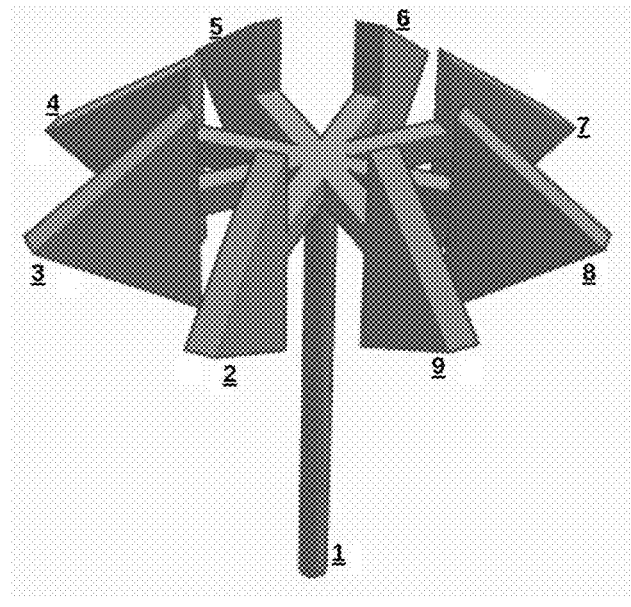
FIG. 17 Fine-granularity horizontal-plane directional antenna array.

To achieve finer granularity in detection and direction finding by the SDDF sensor, more antennas may be added to construct larger antenna arrays. FIG. 17 shows an example of achieving finer granularity in the horizontal plane by using 8 directional antennas FIG. 17.2 to FIG. 17.9 compared to 4 directional antennas.

Figure 18:
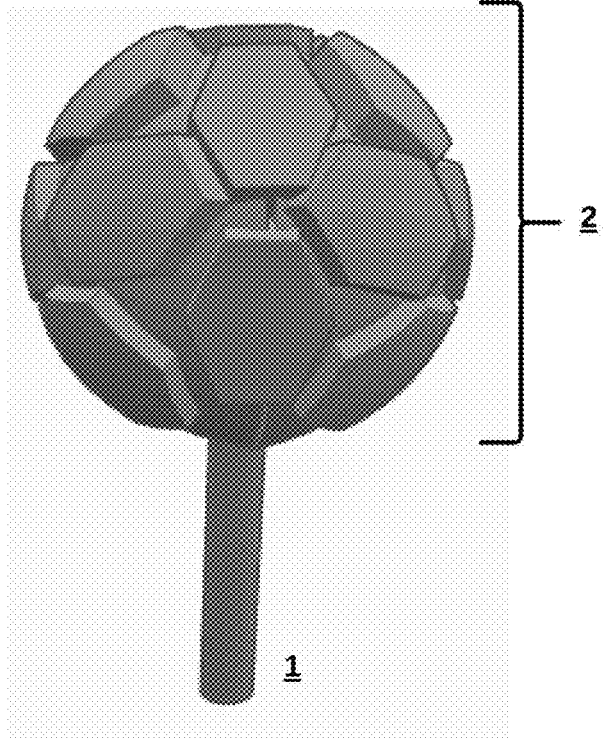
FIG. 18 Honeycomb-like antenna array.

The SDDF add-on module can use almost any type of directional antenna. FIG. 18 shows an example of a honeycomb-like antenna array FIG. 18.2 constructed from polygon-shaped patch directional antennas that each individual antenna can have a different directional pattern or directional gain compared to other types of directional antennas. Despite the differences between the directional antennas, the SDDF add-on module can still operate as intended for each use case due to the use of the machine-learning feature of the MLCDF algorithm. Because the elements within one antenna array do not need to be uniform, different elements of the same array can have different characteristics including but not limited to gain, directionality, shape, and size.

Figure 19:
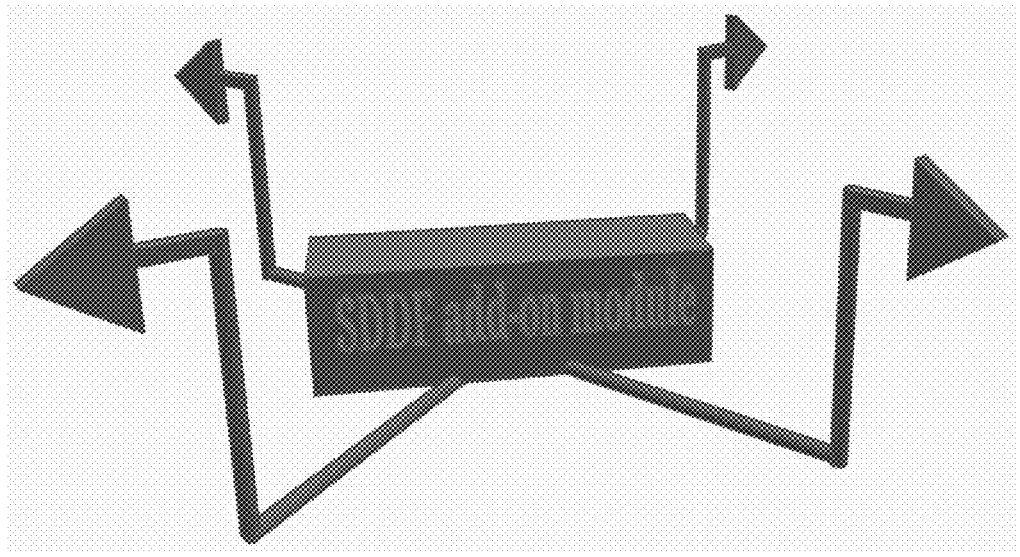
FIG. 19 Decentralized directional antenna array connected to a SDDF add-on module.

Another example of the antenna array is when the directional antennas construct an antenna array that is not centralized at the same location. This design is also possible with the SDDF add-on module thanks to the machine-learning feature of the MLCDF algorithm. The antennas can be spread out at different locations in any orientation as needed. FIG. 19 shows a simple example of such a scenario. The directional antennas are at different physical locations and connected to the SDDF add-on module. This can be accomplished over large distances by leveraging many technologies including but not limited to RF over fiber optics, hardline coaxial cables, or wireless connections.

Figure 20:
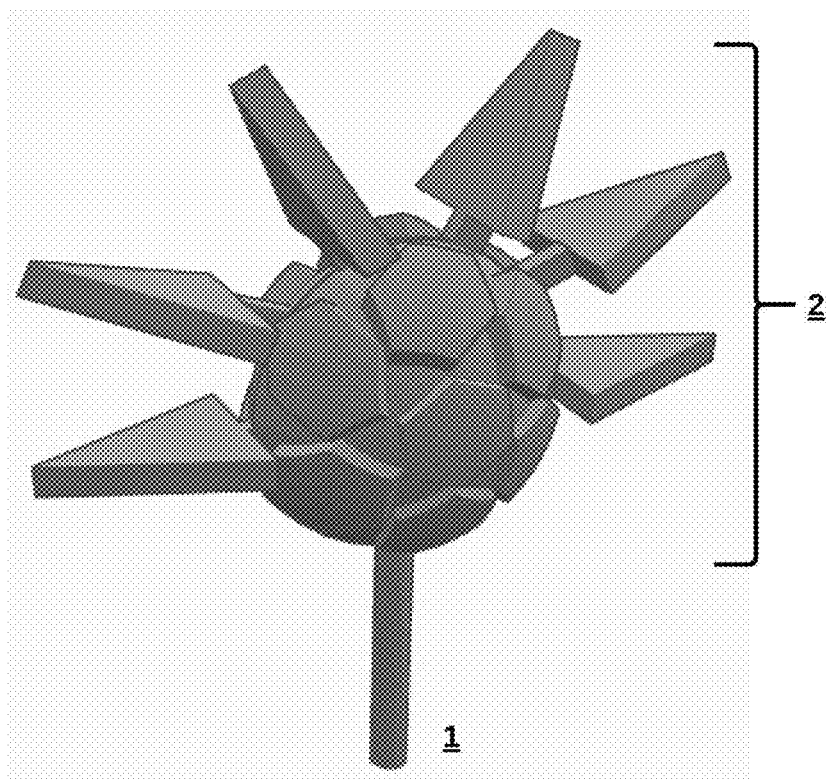
FIG. 20 Mixture of directional antennas constructing one antenna array.

Another advantage of the machine-learning feature of the MLCDF algorithm is that the antenna array can be a mixture of different antenna types. FIG. 20 shows one example of this case, where the figure shows an antenna array constructed from a mixture of multi-element directional antennas and patch directional antennas.

System Design

Figure 21:
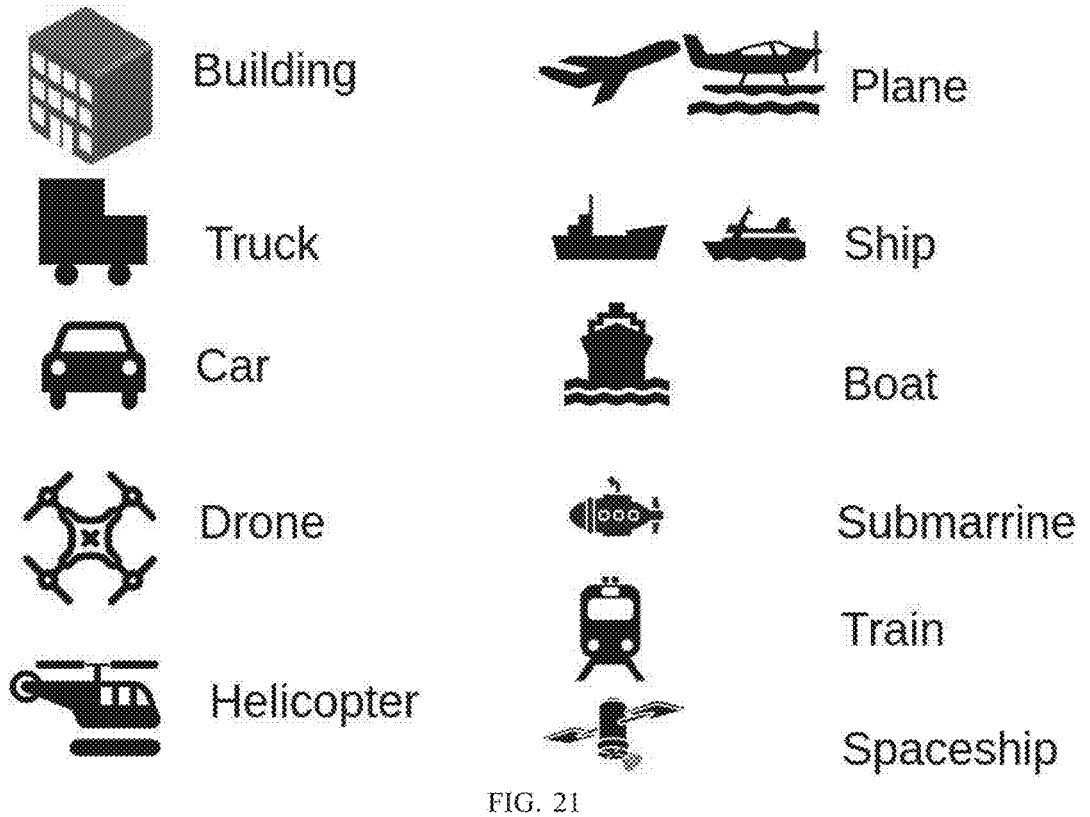
FIG. 21 SD sensor, SDDF add-on module, and SDDF sensor mounting locations.

The SD sensor and SDDF sensor can be mounted on any type of moving and/or non-moving objects, vehicles, structures, and buildings, carried by people, etc. Some examples of possible mounting objects are shown in FIG. 21.

Note that a gyroscope may be used with or integrated into the SDDF add-on module when it is mounted on a moving object (e.g. car). The gyroscope can automatically feed the orientation of the directional antenna to the MLCDF algorithm to provide an accurate direction as the mounting object moves around. The gyroscope may not be needed in the cases of non-moving mounting objects (e.g. buildings) if the antennas are aligned accurately during installation. Other technologies may also be used to provide orientation awareness to the SDDF sensor for the same purposes.

The MLCDF algorithm proposed in this patent can be used in different scenarios to help detect, locate, and track drones and their controllers. The system's preferred embodiment includes but is not limited to utilizing SDDF add-on modules:

construct a stand-alone SDDF sensor, be attached to a DDS, construct an SDDF sensor in a system consisting of multiple SDDF sensors forming a full DDS, and construct an SDDF sensor in a system consisting of multiple SDDF sensors alongside SD sensor-based DDS.

A stand-alone sensor: The SDDF sensor uses its first SD submodule to continuously scan the frequency spectrum on each of its directional antennas, and switch between the antennas using an RF switcher. When a detection occurs via the first SD submodule, the second SD submodule is used to verify the existence of the signal and measure the received power at some or all directional antenna. Then DF submodule is used to find the direction of the detected signal source using the measured power values from each directional antenna as input to the direction finding algorithm. The SDDF sensor keeps track of the detected signal's direction until it disappears. Note that during the detection of one signal, the operation of scanning, detection, and tracking of other signals on the same or different frequency channels continues without interruption due to the two SD module nature of the system.

FIG. 22, FIG. 23, FIG. 24, and FIG. 25 show examples of such system.

Figure 22:
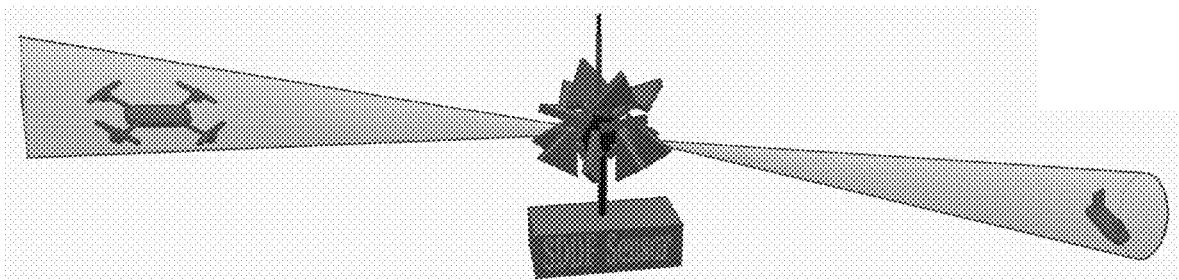
FIG. 22 Example of a SDDF stand-alone sensor.

The example shown in FIG. 22 represents a stand-alone SDDF sensor with one omni-directional antenna and an antenna array consisting of directional antennas pointing in different directions (in the horizontal, vertical, and diagonal planes). The SDDF sensor monitors the surrounding RF environment for drone/controller-like signal using its first SD submodule through the omni-directional antenna. Once there is a detection, the SDDF sensor uses its second SD submodule and its DF submodule to find the direction from which the drone/controller signal originates using the directional antenna array. Note that the SDDF sensor can continue to detect, track, and find the direction of drone and controller signals simultaneously.

Figure 23:
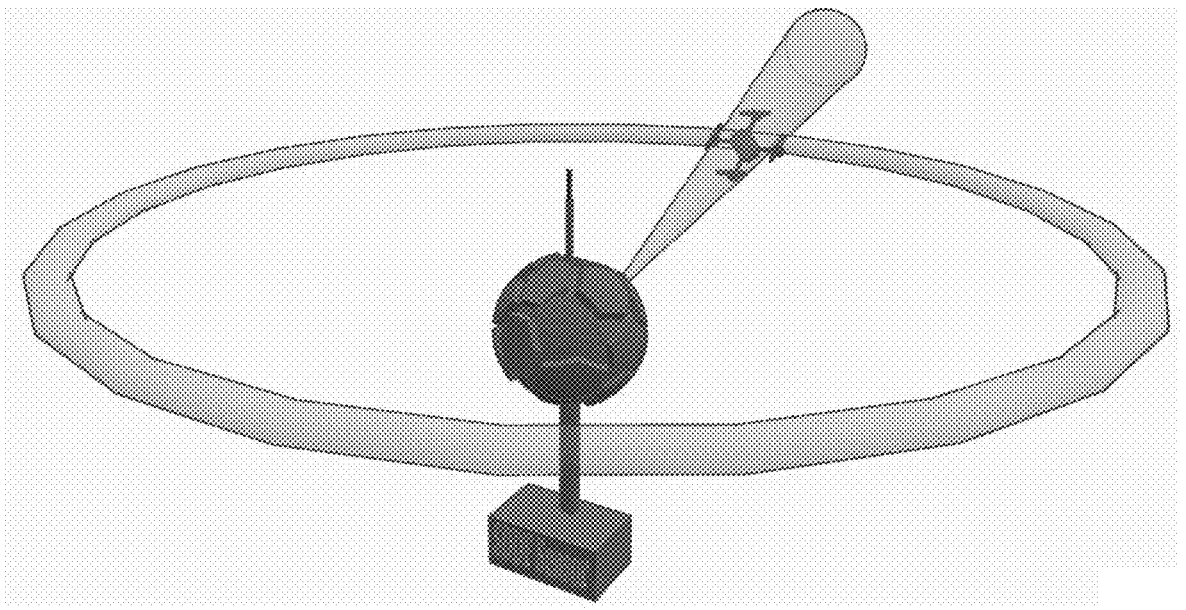
FIG. 23 Example of a SDDF stand-alone sensor.

The example shown in FIG. 23 represents another example of a stand-alone SDDF sensor with one omni-directional antenna and an antenna array that consists of directional antennas pointed in different directions (in the horizontal, vertical, and diagonal planes). The detected signal's power value is measured by the first SD submodule to have a sense of how far the drone signal is from the omni-directional antenna (i.e. the circular space shown in FIG. 23). After detection, the second SD submodule and the DF submodule are used to find the direction from which the signal originates. Hence, the intersection between the distance and the direction provides a predicted location of the detected signal.

Figure 24:
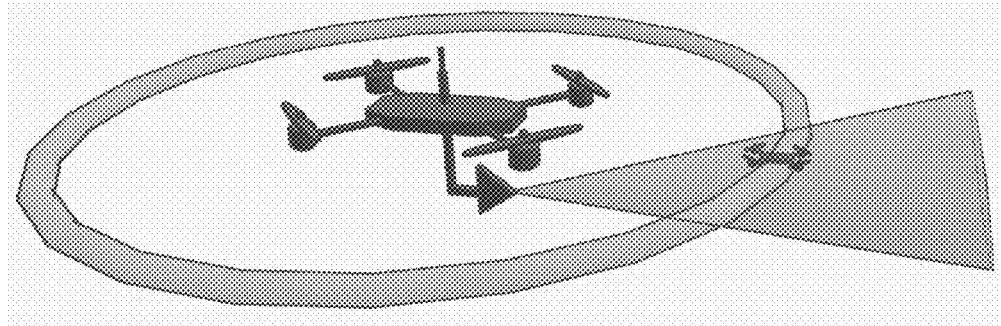
FIG. 24 Example of a SDDF stand-alone sensor.

The example shown in FIG. 24 represents another example of a stand-alone SDDF sensor with one directional antenna pointing in one direction and one omni-directional antenna. A couple of examples of this design usage include but are not limited to the following. The first example is very similar to the design in FIG. 23 but instead of having a switcher, the SDDF sensor is mounted on a drone which is pre-programmed to rotate or orient itself in a certain direction every short pre-defined period of time (after a confirmed drone/controller detection by the SD submodule through the omni-directional antenna) to collect the power values in a way similar to a switcher and an antenna array. After collecting all of the needed power values, the power vector is fed to the MLCDF algorithm which estimates the direction from which the detected signal emanates from. By combining the estimated signal's direction, and using the predicted distance (from the SD submodule with the omni-directional antenna), a predicted drone/controller location can be provided. Note that the predicted direction in this method can be any direction and does not need to be in the direction of the directional antenna.

The second example is a simpler method where the DF submodule is not used (less accurate than the previous example where the MLCDF algorithm and DF submodule are used). In this second example, only the two SD submodules are used. The first SD submodule is connected to the omni-directional antenna, while the second SD submodule is connected to the directional antenna. After a detection is confirmed by the first SD submodule through the omni-directional antenna, the second SD module is used to check if there is a correlation (i.e. a match) between the physical characteristics of the detected signal from the first SD submodule and the signal seen on the directional antenna using the second SD submodule. If there is a match in multiple directional antenna orientations, the predicted direction can be in the direction of the highest power value. Note that the second example is simple, does not follow the MLCDF algorithm, and does not use a DF submodule, hence, less accurate than the first example. The intersection between the predicted drone distance (by the first SD submodule) from the omni-directional antenna, and the predicted direction using the correlation method (in the second SD submodule), a drone/controller location can be provided.

Figure 25:
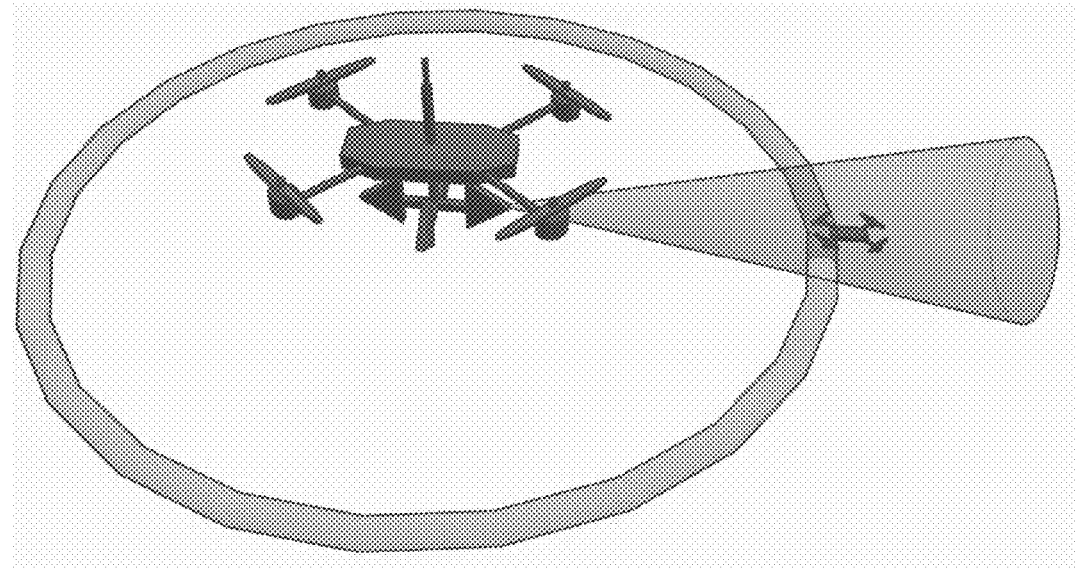
FIG. 25 Example of a SDDF stand-alone sensor.

The example shown in FIG. 25 represents a stand-alone SDDF sensor that is very similar to the example shown in FIG. 23 but instead of having the SDDF sensor mounted on a fixed object, it is mounted on a moving object (a mounting drone is used here).

Figure 26:
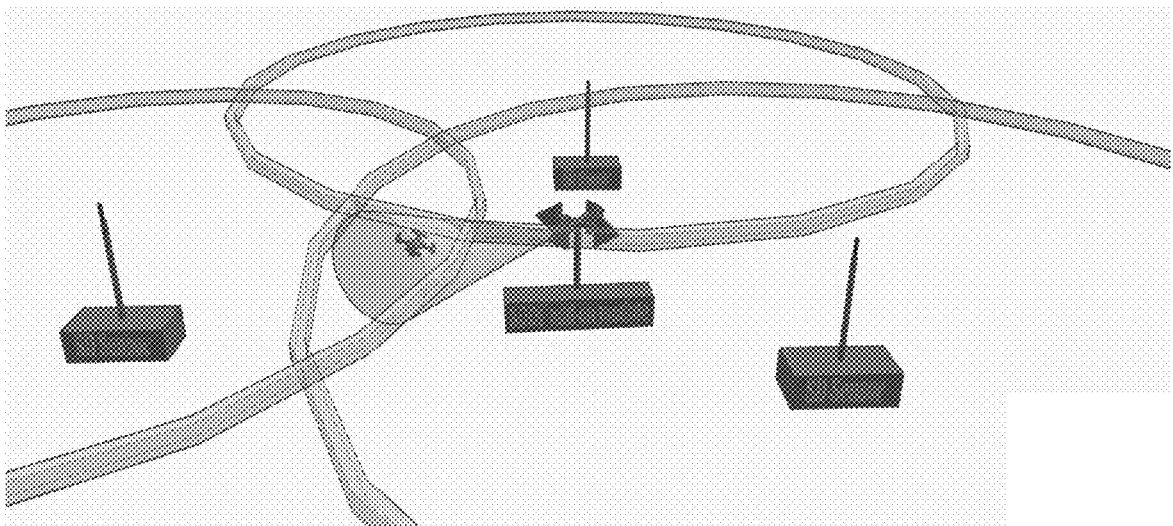
FIG. 26 Example on using the SDDF add-on module to a trilateration-based DDS.

An add-on module to a DDS: The SDDF add-on module can be used in con-junction with any other location methods such as triangulation, trilateration, angle of arrival, time difference of arrival, frequency difference of arrival, phase difference of arrival, etc. to accurately locate the detected drone/controller signals. FIG. 26 shows examples of a trilateration system where the signal's power value is translated into a distance at each SD sensor, the imaginary descriptive distance torus around each SD sensor. The intersections between these toruses represent a possible location for the detected signal. The SDDF add-on module is very helpful in such DDS since it narrows down the number of possible locations for the detected signal by pointing at the direction the signal originates, hence improving the system accuracy of locating and tracking as a whole. Note that the cone-shaped transparent space represents all the possible points from which the signal is coming from the perspective of the SDDF add-on module.

As a sensor in a system consists of multiple SDDF sensors forming a DDS: Multiple SDDF sensors and SDDF add-on modules can work together to detect, locate, and track drones and their controllers forming a full direction-finding-based DDS.

Figure 27:
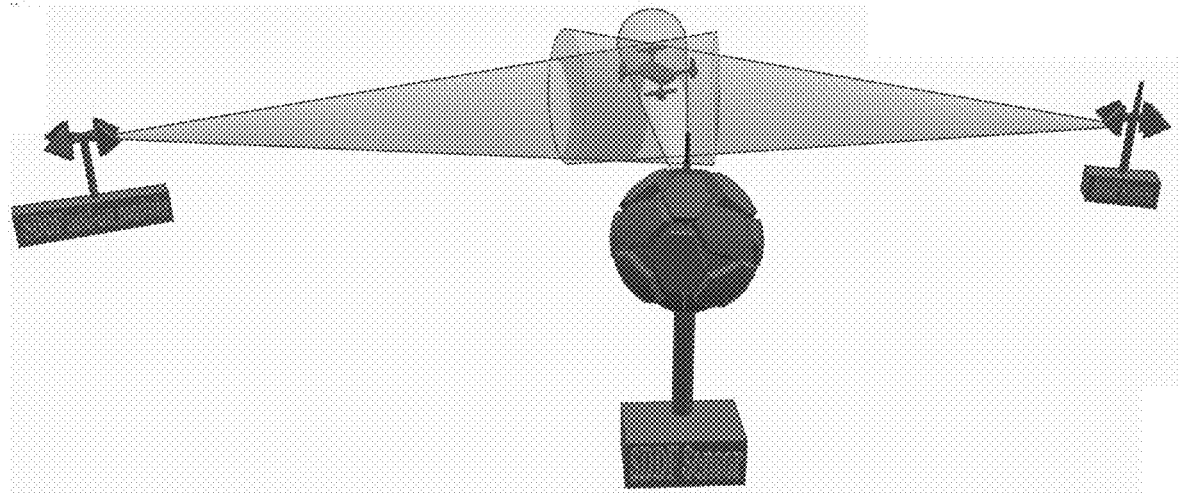
FIG. 27 Example of a SDDF sensors and an SDDF add-on module forming a full DDS.

FIG. 27 shows an example of such system. As can be seen from the figure, there are two SDDF sensors and one SDDF add-on module. The two SDDF sensors provide continuous detection for possible drones and controllers. When a detection happens at one or both of the SDDF sensors, the information is shared with the SDDF add-on module. After detection, the two SDDF sensors and the SDDF add-on module work together to find the location of the detected drone/controller. The space formed from the intersection between all (or some) of the cone-shaped pointing spaces represents the predicted location of the detected drone/controller signal. Note that the SDDF sensors do not have to be identical if the MLCDF algorithm is used.

Figure 28:
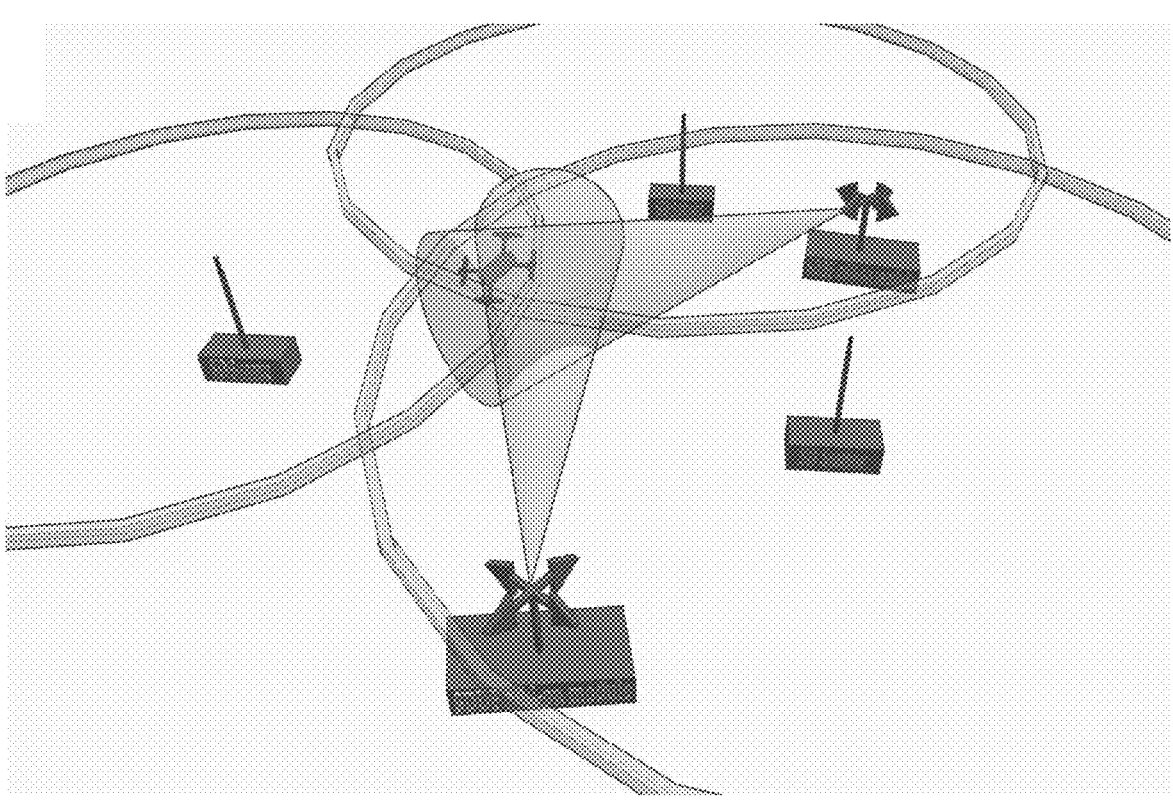
FIG. 28 Example of a full DDS constructed from one direction-finding based DDS and one trilateration-based DDS.

As a sensor in a system consists of multiple SDDF sensors alongside a DDS: Multiple SDDF sensors can work alongside a DDS to achieve a higher level of accurate detection, locationing and tracking of drones' and controllers' signals. The multiple SDDF sensors together form a direction-finding-based DDS that can work with other types of DDS (e.g. trilateration-based DDS system). The two DDSs working together can outperform either of the DDSs if used individually. FIG. 28 shows an example of a direction-finding-based DDS working alongside a trilateration-based DDS forming together one more effective DDS with better detection, locating, and tracking of drones' and controllers' signals

What is claimed:

1. A signature detector and direction finding (SDDF) add-on module comprising:
   a signature detector submodule configured to recognize and filter a target signal based on physical features of the target signal, wherein the target signal is recognized from more than one signal, with each of the more than one signal being present on an identical channel; and
   a directional finding submodule configured to determine a direction of the target signal, wherein the signature detector submodule is configured to recognize and filter the target signal from non-target signals prior to determining the direction of the target signal,
   wherein the directional finding submodule is configured to receive a vector of power values from the signature detector submodule and utilize a machine-learning-based system to estimate the direction from which the target signal originated, and
   wherein the directional finding submodule comprises one or more directional antenna.

2. The SDDF add-on module of claim 1 wherein the SDDF add-on module is configured to be retrofitted to an existing signal detection system.

3. The SDDF add-on module of claim 1 further comprising one or more antenna.

4. A SDDF sensor, the sensor comprising:
   a signal detector and direction finding (SDDF) add-on module, wherein the SDDF add-on module comprises:
   a signature detector submodule configured to recognize and filter a target signal based on physical features of the target signal,
      wherein the target signal is recognized from more than one signal, with each of the more than one signal being present on an identical channel, and
   a directional finding submodule configured to determine a direction of the target signal,
      wherein the directional finding submodule comprises one or more directional antenna; and
   a signature detection (SD) sensor having at least one omnidirectional antenna, wherein the signal detection sensor is configured to detect the target signal and measure at least one characteristic of the target signal; and
   wherein the signature detector submodule is configured to recognize and filter the target signal from non-target signals prior to determining the direction of the target signal, and
   wherein the directional finding submodule is configured to receive a vector of power values from the signature detector submodule and utilize a machine-learning-based system to estimate the direction from which the target signal originated.

5. A method of direction finding a target signal source, the method comprising the steps of:
   scanning, using a signature detection (SD) sensor,
      wherein the SD sensor comprises at least a signature detector submodule;
   detecting, using the SD sensor, one or more of a target signal from an environment;
   estimating a distance of a source of the target signal from the SD sensor;
   receiving, via a directional finding submodule, a vector of power values from the signature detector submodule to estimate the direction from which the target signal originated;
   determining a direction of the target signal, using a signal detector and direction finding (SDDF) add-on module,
      wherein determining the direction of the target signal comprises collecting power readings from one or more directional antenna and generating an angle value directed to the direction from which the target signal originated; and estimating a location of the target signal by calculating an intersection between a calculated distance of the source of the target signal and a calculated direction of the target signal; and wherein the signature detector submodule is configured to recognize and filter the target signal from non-target signals prior to determining the direction of the target signal.

6. The method of claim 5 wherein the intersection comprises a plurality of points with each of the plurality of points being directed to an estimated location of the target signal.

7. The method of claim 6 wherein an average of the plurality of points is determined to be a location of origination of the target signal.

8. The method of claim 5 wherein the determining step is performed separately from the detecting step.

9. The method of claim 5 wherein the determining step is performed simultaneously with the detecting step.

10. The method of claim 5 further comprising a directional finding submodule is configured to receive a vector of power values from the signature detector submodule to estimate the direction from which the target signal originated.

11. The method of claim 10 wherein the signature detector submodule is configured to measure power levels of the target signal and send the measure of the power levels to the directional finding submodule.

12. The method of claim 5 wherein the signature detection submodule is configured to detect the target signal, extract physical features from the target signal, and estimate a distance of the target signal from the signature detection sensor.

13. A Signal Detection System (SDS) to recognize a target signal based on physical features of the target signal to detect, track and locate a location of origin of the target signal, the SDS comprising:

at least one signature detection (SD) sensor,
    wherein the SD sensor comprises at least a first signature detector submodule;

at least one signal detector and direction finding (SDDF) add-on module,
    wherein the SDDF add-on module comprises at least a second signature detector submodule and a direction finding submodule,
        wherein the direction finding submodule comprises one or more directional antenna, and
        wherein the direction finding submodule is configured to receive a vector of power values from the first signature detector submodule and utilize a machine-learning-based system to estimate the direction from which the target signal originated;

one or more of SDDF sensors,
    wherein the one or more SDDF sensors comprise at least one of: a second SD sensor and a second SDDF add-on module; and one or more sub-SDS systems that can detect, track, and locate a location or origin of the target signal;

wherein the target signal is recognized from more than one signal, with each of the more than one signal being present on an identical channel.

* * * * *